Patented Jan. 13, 1942

2,269,890

UNITED STATES PATENT OFFICE 2,269,890

SEISMIC-ELECTRIC PROSPECTING

Ludwig W. Blau, Houston, Tex., assignor to Standard Oil Development Company, a corporation of Delaware Application September 30, 1939, Serial No. 297,248

7 Claims. (Cl. 181—0.5)

The present invention relates to a process of seismic electric prospecting.

It is known to the art, as described in U. S. Patent No. 2,054,067, to pick up seismic waves passing through the earth by placing two electrodes in the earth, connecting the electrodes through the low winding of a transformer and a source of current and connecting the high winding of the transformer to the input of an amplifier and recorder. Seismic waves passing through the earth cause the resistance of the earth to vary, and this variation in resistance is transmitted to the recorder and produces a seismic record.

The above mentioned method of seismic electric prospecting has a number of advantages over the conventional method of using geophones. For example, the seismic waves picked up are not influenced by local ground conditions, but represent an average of the ground conditions between the two electrodes. Then, too, while the ordinary geophone contains a mass which theoretically should remain still, but actually must vibrate, the seismic electric method eliminates this difficulty.

It has been found in some areas that in the seismic electric method of prospecting difficulties are encountered in that erratic current changes of small values appear as noise on the seismogram. For example, if the electrodes placed in the earth cause a slight variation in the circuit current, this variation is transmitted to the recorder. In accordance with the present invention the small erratic current changes are eliminated and a record is obtained on which substantially nothing more than the seismic disturbances appear.

It may be broadly stated that in the present invention the improvement over the prior art resides in using two separate sets of electrodes. One set of electrodes is connected through a variable resistance to a battery, while the other set of electrodes is connected to the low side of the winding of a transformer, the high side of the winding of the transformer being in a circuit including an amplifier and recorder.

Figure 1:
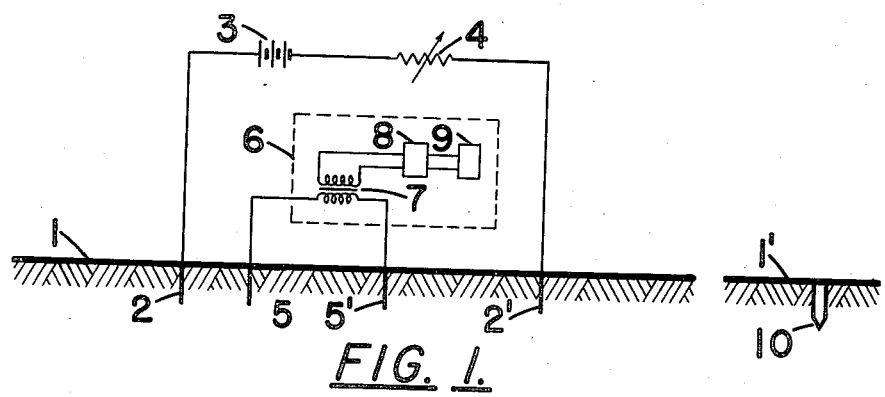
Figure 2:
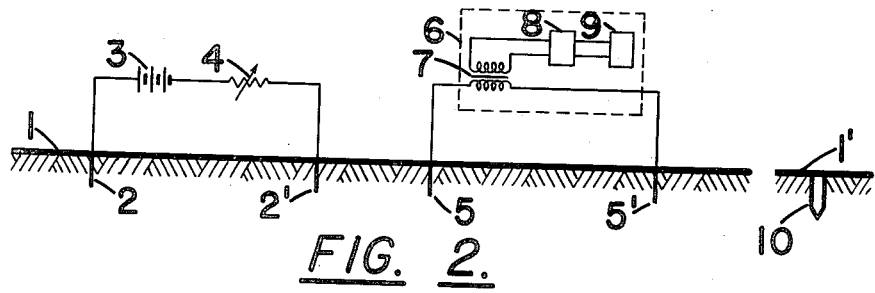
Figure 3:
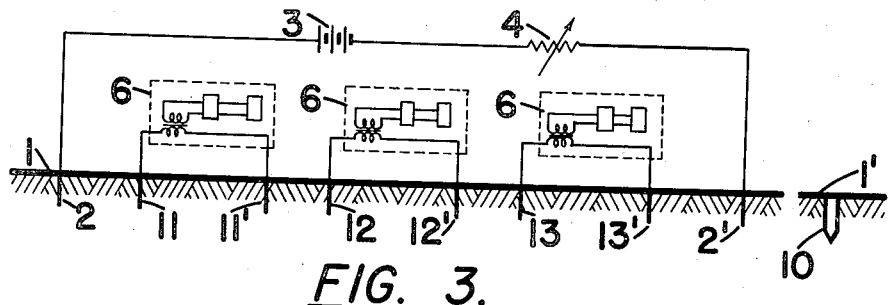
Figure 4:
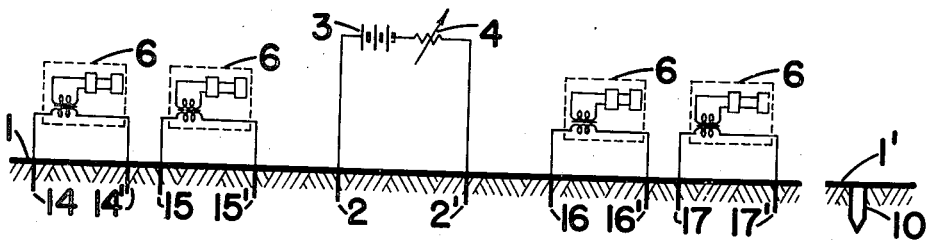

Other objects and advantages of the present invention may be seen from the following description taken with the drawing in which Fig. 1 is a diagrammatic representation of one modification of the present invention; and Figs. 2, 3 and 4 are diagrammatic representations of other modifications of the present invention.

Referring specifically to Fig. 1, numerals 1 and 1' designate the surface of the earth. Electrodes 2 and 2' are buried in the earth to any suitable or desirable depth. Between the electrodes are connected a battery 3 and a variable resistance 4, the latter for the purpose of adjusting the magnitude of the current flowing through the ground between the electrodes 2 and 2'. Potential electrodes 5 and 5' are spaced between, and preferably in alignment with, the current electrodes 2 and 2', and a potentiometer 6 is connected between the potential electrodes. This potentiometer includes an amplifier 8, and a recorder 9, such as are used in the conventional method of seismic electric prospecting and in addition thereto transformer 7. Numeral 10 designates the point at which seismic waves are generated by an explosion, a mechanical oscillator, or the like.

Another embodiment of the present invention is shown in Fig. 2 in which like numerals have the same significance as in Fig. 1. In this modification, the potential circuit, consisting of potential electrodes 5 and 5', with the potentiometer 6 connected between them, is placed outside and preferably in alignment with the current electrodes 2 and 2'.

A third modification is shown in Fig. 3 in which three potential circuits with the potential electrodes 11 and 11', 12 and 12', and 13 and 13' are located between the current electrodes 2 and 2'.

In Fig. 4, the potential electrodes 14 and 14' and 15 and 15' are located, preferably in alignment with and outside of the current electrodes 2 and 2', while potential electrodes 16 and 16' and 17 and 17' are located outside the current electrodes 2 and 2' and preferably in alignment with them on the side opposite the former two potential circuits.

The embodiments shown in Figs. 3 and 4 provide for multiple recording, and it is understood that any number of potential circuits may be used and some or all of the advantages of the invention will be retained.

The objects and advantages of the present invention having been thus described and illustrated, what is claimed as new and useful and is desired to be secured by Letters Patent is:

1. A method of seismic electric prospecting comprising the steps of passing an electric current through the ground using a plurality of separate potential pickup circuits to determine the potential of said current at various points of its passage through the earth, whereby variations in said current caused by a seismic disturbance are detected by the potential pickup circuits and creating a seismic disturbance in ground influenced by said current.

2. In a method of seismic electric prospecting the steps of passing a current through the earth by means of a current source connected to a pair of electrodes in contact with the earth, the production of a seismic disturbance and the detection of said seismic disturbance by means of potential pickup circuits, the pickup circuits showing the potential in the earth between the electrodes in contact with the earth, the potential electrodes being located on a projection of the line upon which the current electrodes are fixed.

3. In a method of seismic electric prospecting the steps of passing a current through the earth by means of a current source connected to a pair of electrodes in contact with the earth, the production of a seismic disturbance and the detection of said seismic disturbance by means of potential pickup circuits, the pickup circuits showing the potential in the earth between the electrodes in contact with the earth, the potential electrodes being located between the current electrodes and upon a line extending from one current electrode to the other.

4. A method of geophysical prospecting comprising the steps of arranging a pair of electrodes on the surface of the earth, passing direct electric current through the earth from one electrode to the other, arranging in the earth an additional pair of electrodes electrically connected through a transformer to potential indicating means to display potential variations resulting from variations of said current, generating seismic waves to produce variations in said current, and displaying the resulting potential variations by said potential indicating means.

5. A method of geophysical prospecting comprising the steps of arranging a pair of electrodes on the surface of the earth, passing direct electric current through the earth from one electrode to the other, arranging in the earth additional pairs of electrodes with each pair electrically connected through a transformer to potential indicating means to display potential variations resulting from variations of said current, generating seismic waves to produce variations in said current, and displaying the resultant potential variations by said potential indicating means.

6. A method in accordance with claim 5 in which the additional pairs of electrodes are arranged on a line connecting said pair of electrodes.

7. A method in accordance with claim 5 in which the additional pairs of electrodes are arranged on extensions of a line connecting the pair of electrodes.

LUDWIG W. BLAU.